US008930980B2

(12) United States Patent　　(10) Patent No.: US 8,930,980 B2
Neumeier et al.　　(45) Date of Patent: Jan. 6, 2015

(54) SYSTEMS AND METHODS FOR REAL-TIME TELEVISION AD DETECTION USING AN AUTOMATED CONTENT RECOGNITION DATABASE

(71) Applicants: Zeev Neumeier, Berkeley, CA (US); Brian Reed, Stamford, CT (US)

(72) Inventors: Zeev Neumeier, Berkeley, CA (US); Brian Reed, Stamford, CT (US)

(73) Assignee: Cognitive Networks, Inc., San Francisco, CA (US)

( * ) Notice: Subject to any disclaimer, the term of this patent is extended or adjusted under 35 U.S.C. 154(b) by 0 days.

(21) Appl. No.: 14/217,094

(22) Filed: Mar. 17, 2014

(65) Prior Publication Data

US 2014/0282673 A1　　Sep. 18, 2014

Related U.S. Application Data

(63) Continuation-in-part of application No. 14/089,003, filed on Nov. 25, 2013, and a continuation-in-part of application No. 12/788,721, filed on May 27, 2010, now Pat. No. 8,595,781, and a continuation-in-part of application No. 12/788,748, filed on May 27, 2010, now Pat. No. 8,769,584, and a continuation-in-part of application No. 14/217,039, filed on Mar. 17, 2014, and a continuation-in-part of application No. 14/217,075, filed on Mar. 17, 2014, and a continuation-in-part of application No. 14/217,375, filed on Mar. 17, 2014, and a continuation-in-part of application No. 14/217,425, filed on Mar. 17, 2014, and a continuation-in-part of application No. 14/217,435, filed on Mar. 17, 2014.

(60) Provisional application No. 61/791,578, filed on Mar. 15, 2013.

(51) Int. Cl.
| | |
|---|---|
| H04N 7/16 | (2011.01) |
| H04H 60/32 | (2008.01) |
| H04N 21/44 | (2011.01) |
| H04N 21/442 | (2011.01) |
| H04N 21/466 | (2011.01) |
| H04N 21/81 | (2011.01) |

(52) U.S. Cl.
CPC ....... *H04N 21/44008* (2013.01); *H04N 21/442* (2013.01); *H04N 21/44204* (2013.01); *H04N 21/4667* (2013.01); *H04N 21/812* (2013.01)
USPC .......................................................... 725/19

(58) Field of Classification Search
CPC ............ H04N 21/23418; H04N 21/24; H04N 21/2407; H04N 21/44008; H04N 21/812
USPC ............... 725/19, 22, 20, 90, 9; 348/772, 553
See application file for complete search history.

(56) References Cited

U.S. PATENT DOCUMENTS 4,677,466 A * 6/1987 Lert et al. .................... 725/22
6,469,749 B1 * 10/2002 Dimitrova et al. ............ 348/722
(Continued)

FOREIGN PATENT DOCUMENTS

WO 2007-114796 10/2007
WO 2009-150425 12/2009

*Primary Examiner* — Nasser Goodarzi
*Assistant Examiner* — An Nguyen
(74) *Attorney, Agent, or Firm* — Puget Patent; Michael Gibbons

(57) ABSTRACT

A system and method for the automated real-time detection and processing of commercial messages, public service announcements or similar short-duration, repeated TV programming segments occurring in one or more broadcast video steams is described. A process is utilized that identifies possible commercial segments by identifying discrete video segments that have specific short durations among other attributes. Video segments that appear to have these charac- Television Ad Detector Utilizing Existing ACR Database teristics are considered likely to be television commercials, promotions, or public service announcements and are stored in a TV Ad database which is separate from the primary television content database. Incoming video from a plurality of television programming sources is process into fingerprints and placed in a master TV content database. At the same time, said incoming programming is tested for matches in a TV ad database. If a match is found, then the presumed TV ad is removed from the master content database.

26 Claims, 12 Drawing Sheets

(56) References Cited

U.S. PATENT DOCUMENTS

| | | |
|---|---|---|
| 6,597,405 B1 * | 7/2003 | Iggulden ................. 348/553 |
| 7,089,575 B2 * | 8/2006 | Agnihotri et al. ............ 725/20 |
| 2003/0121046 A1 * | 6/2003 | Roy et al. .................. 725/90 |
| 2004/0226035 A1 * | 11/2004 | Hauser, Jr. ................... 725/9 |
| 2005/0015795 A1 * | 1/2005 | Iggulden ................... 725/20 |
| 2006/0029368 A1 | 2/2006 | Harville |
| 2006/0245724 A1 | 11/2006 | Hwang |
| 2009/0088878 A1 | 4/2009 | Otsuka |

* cited by examiner

Nielsen Ad Detector Flow-Chart
(Included for comparison)

PRIOR ART

Fig. 12

1200 At least one non-transitory computer-readable medium

1204 One or more instructions for:
   (a)   Ingesting at least one audiovisual stream, including at least storing at least some data associated with one or more frames of the audiovisual stream into a data store of program content
   (b)   determining a candidate segment, the candidate segment including at least one or more sequential frames from at least one ingested audiovisual stream, and
   (c)   testing a determined candidate segment for at least one match in a data store of known advertisements and, if testing the candidate segment returns at least one match in the data store of known advertisements, at least removing at least some data associated with the candidate segment from the data store of program content

Fig. 13

1300 A system

1302 Circuitry configured for ingesting at least one audiovisual stream, including at least storing at least some data associated with one or more frames of the audiovisual stream into a data store of program content 1304 Circuitry configured for determining a candidate segment, the candidate segment including at least one or more sequential frames from at least one ingested audiovisual stream 1306 Circuitry configured for testing a determined candidate segment for at least one match in a data store of known advertisements and, if testing the candidate segment returns at least one match in the data store of known advertisements, at least removing at least some data associated with the candidate segment from the data store of program content

US 8,930,980 B2

SYSTEMS AND METHODS FOR REAL-TIME TELEVISION AD DETECTION USING AN AUTOMATED CONTENT RECOGNITION DATABASE

PRIORITY CLAIM

This application constitutes a continuation-in-part of U.S. patent application Ser. No. 12/788,721, entitled "METHODS FOR IDENTIFYING VIDEO SEGMENTS AND DISPLAYING CONTEXTUAL TARGETED CONTENT ON A CONNECTED TELEVISION," filed May 27, 2010, and issued Nov. 6, 2013 as U.S. Pat. No. 8,595,781, that application being a non-provisional application claiming priority from U.S. Provisional Patent Application No. 61/182,334, entitled "SYSTEM FOR PROCESSING CONTENT INFORMATION IN A TELEVIDEO SIGNAL," filed May 29, 2009 and being a non-provisional application claiming priority from U.S. Provisional Patent Application No. 61/290,714, entitled "CONTEXTUAL TARGETING BASED ON DATA RECEIVED FROM A TELEVISION SYSTEM," filed Dec. 29, 2009; this application further constitutes a continuation-in-part of U.S. patent application Ser. No. 12/788,748, entitled "METHODS FOR DISPLAYING CONTEXTUALLY TARGETED CONTENT ON A CONNECTED TELEVISION," filed May 27, 2010; this application further constitutes a continuation-in-part of U.S. patent application Ser. No. 14/089,003, entitled "METHODS FOR IDENTIFYING VIDEO SEGMENTS AND DISPLAYING CONTEXTUALLY TARGETED CONTENT ON A CONNECTED TELEVISION," filed Nov. 25, 2013; this application further constitutes a continuation-in-part of U.S. patent application Ser. No. 14/217,039, entitled "SYSTEMS AND METHODS FOR ADDRESSING A MEDIA DATABASE USING DISTANCE ASSOCIATIVE HASHING," filed Mar. 17, 2014; this application further constitutes a continuation-in-part of U.S. patent application Ser. No. 14/217,075, entitled "SYSTEMS AND METHODS FOR IDENTIFYING VIDEO SEGMENTS FOR DISPLAYING CONTEXTUALLY RELEVANT CONTENT," filed Mar. 17, 2014; this application further constitutes a continuation-in-part of U.S. patent application Ser. No. 14/217,375, entitled "SYSTEMS AND METHODS FOR ON-SCREEN GRAPHICS DETECTION," filed Mar. 17, 2014; this application further constitutes a continuation-in-part of U.S. patent application Ser. No. 14/217,425, entitled "SYSTEMS AND METHODS FOR IMPROVING SERVER AND CLIENT PERFORMANCE IN FINGERPRINT ACR SYSTEMS," filed Mar. 17, 2014; this application further constitutes a continuation-in-part of U.S. patent application Ser. No. 14/217,435, entitled "SYSTEMS AND METHODS FOR MULTI-BROADCAST DIFFERENTIATION," filed Mar. 17, 2014; and this application further constitutes a non-provisional application of U.S. Provisional Patent Application No. 61/791,578, entitled "SYSTEMS AND METHODS FOR IDENTIFYING VIDEO SEGMENTS BEING DISPLAYED ON REMOTELY LOCATED TELEVISIONS," filed Mar. 15, 2013. The foregoing applications are either currently co-pending or are applications of which a currently co-pending application is entitled to the benefit of the filing date.

FIELD OF THE INVENTION

This invention generally relates to image recognition, and more particularly, to systems and methods for real-time television ad detection using an automated content recognition database.

BACKGROUND

The automated detection of TV commercials has long been an area of great interest to different constituencies. Many consumers have wished for some way to mute or even skip entire commercials, particularly in programming that is recorded for time-shifted viewing. Numerous solutions for this need have been proposed and all run at the consumer device level and involve identifying commercials one at a time as they occur in the broadcast video stream being watched or recorded.

The other use of such automated content recognition technology is by those parties with a need to verify that specific TV commercials have actually been broadcast as contracted for on each of numerous channels, time slots and markets. In addition, other companies perform research and collect statistics on which companies are running which advertisements in which markets. This data can be for the companies' own use, or for resale. Meanwhile, other firms research commercials to develop more effective advertisements for clients. These types of analysis are usually done on a market-by-market level and require monitoring a large number of channels and markets.

For the past half-century, such commercial verification or collection procedures were manually performed by human beings during scheduled broadcast time(s), or by visually searching (fast forwarding, rewinding, etc.) a tape or other record of an earlier broadcast. As can be appreciated, waiting for a commercial to air (broadcast), setting up recording equipment to record a broadcast, and/or searching records of broadcast content to verify commercial content airing(s) can be time consuming, laborious, and costly undertakings. Therefore, there is an unmet need to optimize an automated process of detection and identification of commercial messages in live video streams.

Because consumers in nearly every market area now have access to cable and satellite systems simultaneously delivering hundreds of channels of programming, the ability to identify, verify, and track which commercials are being broadcast in which markets at any given time, presents a non-trivial computational challenge. The prior art in the area has been primarily focused on identifying when a single viewing device such as a TV set is presented with a commercial. Scaling approaches already known to those skilled in the art, to enable them to simultaneously monitor hundreds of steams of video in real time while keeping the costs of computation power and storage commercially reasonable remains an unmet need.

SUMMARY

In some embodiments, an exemplary method related to real-time television ad detection using an automated content recognition database may include ingesting at least one audiovisual stream, including at least storing at least some data associated with one or more frames of the audiovisual stream into a data store of program content; determining a candidate segment, the candidate segment including at least one or more sequential frames from the at least one ingested audiovisual stream; and testing the determined candidate segment for at least one match in a data store of known advertisements and, if testing the candidate segment returns at least one match in the data store of known advertisements, at least removing at least some data associated with the candidate segment from the data store of program content.

In some embodiments, an exemplary method related to real-time television ad detection using an automated content recognition database may further include testing the determined candidate segment for at least one match in the data store of program content and, if testing the candidate segment returns at least one match in the data store of program content, at least removing at least some data associated with the candidate segment from the data store of program content and storing at least some data associated with the candidate segment in the data store of known advertisements.

In some embodiments, determining a candidate segment, the candidate segment including at least one or more sequential frames from the at least one ingested audiovisual stream may include receiving one or more indications of a frame of the ingested audiovisual data stream; analyzing the one or more indications of a frame, including at least determining whether the one or more indications could be a starting frame of a candidate segment; if a starting frame is determined, analyzing one or more frames received subsequent to the starting frame, including at least determining whether one of the one or more frames received subsequent to the starting frame could be an ending frame; and if an ending frame is determined, establishing (i) the starting frame, (ii) the one or more frames received subsequent to the starting frame and previous to the ending frame, and (iii) the ending frame as the candidate segment.

In some embodiments, analyzing the one or more indications of a frame, including at least determining whether the one or more indications could be a starting frame of a candidate segment and analyzing one or more frames received subsequent to the starting frame, including at least determining whether a frame received subsequent to the starting frame could be an ending frame may include determining whether a frame is at least one of a monochromatic frame or a frame having one or more substantially different fingerprint values from an immediately-previous frame and, if a frame is at least one of a monochromatic frame or a frame having one or more substantially different fingerprint values from an immediately-previous frame, establishing the frame as at least one of a starting frame or an ending frame.

In some embodiments, determining a candidate segment, the candidate segment including at least one or more sequential frames from the at least one ingested audiovisual stream may include receiving one or more indications of a frame of the ingested audiovisual data stream; comparing data associated with a contiguous sequence of ingested frames ending with the most recently received frame with data associated with one or more contiguous sequences of frames previously stored in the data store of program content; and providing one or more indications of one or more contiguous sequences of frames previously stored in the data store of program content based at least partially on the comparing data.

In some embodiments, determining a candidate segment, the candidate segment including at least one or more sequential frames from the at least one ingested audiovisual stream may further include for each of the one or more indicated contiguous sequences of frames, determining whether the contiguous sequence of frames is an advertisement. In some embodiments, determining whether the contiguous sequence of frames is an advertisement may include evaluating at least one of a length in seconds or a count in frames associated with the contiguous sequence of frames and, if the at least one of a length in seconds or a count in frames is substantially similar to a standard advertisement length, establishing the contiguous sequence of frames as a candidate segment. In some embodiments, evaluating at least one of a length in seconds or a count in frames associated with the contiguous sequence of frames and, if the at least one of a length in seconds or a count in frames is substantially similar to a standard advertisement length, establishing the contiguous sequence of frames as a candidate segment may further include adjusting at least one threshold associated with matching, the adjusted at least one threshold associated with a lower returned number of suspects; matching the candidate segment with the one or more contiguous sequences of frames previously stored in the data store based at least partially on the adjusted at least one threshold; and if the candidate segment matches the one or more contiguous sequences of frames previously stored in the data store based at least partially on the adjusted at least one threshold, determining starting and ending points of the candidate segment.

In some embodiments, adjusting at least one threshold associated with matching, the adjusted at least one threshold associated with a lower returned number of suspects may include adjusting at least one radius associated with a path pursuit algorithm, the adjusted at least one radius associated with a lower returned number of suspects. In some embodiments, adjusting at least one threshold associated with matching, the adjusted at least one threshold associated with a lower returned number of suspects may include adjusting at least one duration related to at least one bin associated with a path pursuit algorithm, the adjusted at least one radius associated with a lower returned number of suspects.

In some embodiments, determining starting and ending points of the candidate segment may include adjusting at least one threshold associated with matching, the adjusted at least one threshold associated with a higher returned number of suspects; comparing one or more indications associated with each frame in the candidate segment with one or more indications associated with a corresponding frame in the one or more contiguous sequences of frames previously stored in the data store, the comparing based at least partially on the adjusted at least one threshold; and testing for inconsistencies between each frame in the candidate segment and a corresponding frame in the one or more contiguous sequences of frames previously stored in the data store, based at least partially on the comparing.

In some embodiments, testing for inconsistencies between each frame in the candidate segment and a corresponding frame in the one or more contiguous sequences of frames previously stored in the data store, based at least partially on the comparing may include if any frame of the candidate segment does not have a corresponding match in the one or more contiguous sequences of frames previously stored in the data store, dropping the frame of the candidate segment without a corresponding match from the one or more contiguous sequences of frames previously stored in the data store. In some embodiments, testing for inconsistencies between each frame in the candidate segment and a corresponding frame in the one or more contiguous sequences of frames previously stored in the data store, based at least partially on the comparing may include if any frame of the one or more contiguous sequences of frames previously stored in the data store does not have a corresponding match in the candidate segment, adding the frame of the one or more contiguous sequences of frames previously stored in the data store to the candidate segment. In some embodiments, testing for inconsistencies between each frame in the candidate segment and a corresponding frame in the one or more contiguous sequences of frames previously stored in the data store, based at least partially on the comparing may include testing for inconsistencies between each frame in the candidate segment and a corresponding frame in the one or more contiguous sequences of frames previously stored in the data store, based at least partially on the comparing; and remediating any inconsistencies found via testing, the remediating operable to identify borders of the candidates.

In some embodiments, ingesting at least one audiovisual stream, including at least storing at least some data associated with one or more frames of the audiovisual stream into a data store of program content and testing the determined candidate segment for at least one match in a data store of known advertisements and, if testing the candidate segment returns at least one match in the data store of known advertisements, at least removing at least some data associated with the candidate segment from the data store of program content may include ingesting at least two audiovisual streams, including at least storing at least some data associated with one or more frames of at least one of the at least two audiovisual streams into a data store of program content, the at least some data including at least one indication of the audiovisual stream from which the one or more frames were received, and testing the determined candidate segment for at least one match in a data store of known advertisements and, if testing the candidate segment returns at least one match in the data store of known advertisements, the at least one match related to any of the at least two audiovisual streams, at least removing at least some data associated with the candidate segment from the data store of program content.

In some embodiments, determining a candidate segment, the candidate segment including at least one or more sequential frames from the at least one ingested audiovisual stream may include confirming a candidate segment having a low threshold match at least partially based on at least one duration of the candidate segment; and confirming the candidate segment having a high threshold match at least partially based on a match of one or more fingerprints of the candidate segment with a known advertisement. In some embodiments, determining a candidate segment, the candidate segment including at least one or more sequential frames from the at least one ingested audiovisual stream may include determining a segment which may be at least one of an advertisement, a commercial, a public service announcement, a promotion, at least a portion of an ad break, at least a portion of an ad pod, or an upcoming television programming promotion. In some embodiments, determining a candidate segment, the candidate segment including at least one or more sequential frames from the at least one ingested audiovisual stream may include determining a candidate segment, the candidate segment including at least one or more sequential video frames from the at least one ingested audiovisual stream.

In some embodiments, an exemplary computer program product related to real-time television ad detection using an automated content recognition database may include at least one non-transitory computer-readable medium, and the at least one non-transitory computer-readable medium may include one or more instructions for ingesting at least one audiovisual stream, including at least storing at least some data associated with one or more frames of the audiovisual stream into a data store of program content; one or more instructions for determining a candidate segment, the candidate segment including at least one or more sequential frames from at least one ingested audiovisual stream; and one or more instructions for testing a determined candidate segment for at least one match in a data store of known advertisements and, if testing the candidate segment returns at least one match in the data store of known advertisements, at least removing at least some data associated with the candidate segment from the data store of program content.

In some embodiments, an exemplary system related to real-time television ad detection using an automated content recognition database may include circuitry configured for ingesting at least one audiovisual stream, including at least storing at least some data associated with one or more frames of the audiovisual stream into a data store of program content; circuitry configured for determining a candidate segment, the candidate segment including at least one or more sequential frames from at least one ingested audiovisual stream; and circuitry configured for testing a determined candidate segment for at least one match in a data store of known advertisements and, if testing the candidate segment returns at least one match in the data store of known advertisements, at least removing at least some data associated with the candidate segment from the data store of program content.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings:

FIG. 12 illustrates an exemplary computer program product.

FIG. 13 illustrates a system related to real-time television ad detection using an automated content recognition database.

DETAILED DESCRIPTION

A system and method for the automated real-time detection and processing of commercial messages, public service announcements or similar short-duration, repeated TV programming segments occurring in one or more broadcast video steams is described. A process is utilized that identifies possible commercial segments by identifying discrete video segments that have specific short durations among other attributes. Video segments that appear to have these characteristics are considered likely to be television commercials, promotions, or public service announcements and are stored in a TV Ad database which is separate from the primary television content database. Incoming video from a plurality of television programming sources is process into fingerprints and placed in a master TV content database. At the same time, said incoming programming is tested for matches in a TV ad database. If a match is found, then the presumed TV ad is removed from the master content database. If a match is not found then the incoming video is tested against the separate TV ad database. If a match is found in the TV ad database, the video segment is removed from the master TV content database. Such an efficient approach enables the system to remove the highly redundant material of TV ads which are known to repeat often and across many channels. This process of detecting and removing TV ads from the main TV content database reduces the number of false positive matches of the primary television content and improves system performance of a video matching system.

The present invention relates generally to video signal processing, and more particularly to techniques for processing multiple streams of broadcast video signals to identify, extract and analyze commercials or other specific types of video content that share certain characteristics or have signatures that match known content. The system to implement said method is composed of a series of software processes running on computer servers. Such servers comprising a microprocessor, data base, input device and output device wherein said data base comprises computer readable instructions stored in fixed memory or other digital storage system and executable by said microprocessor.

Figure 1:
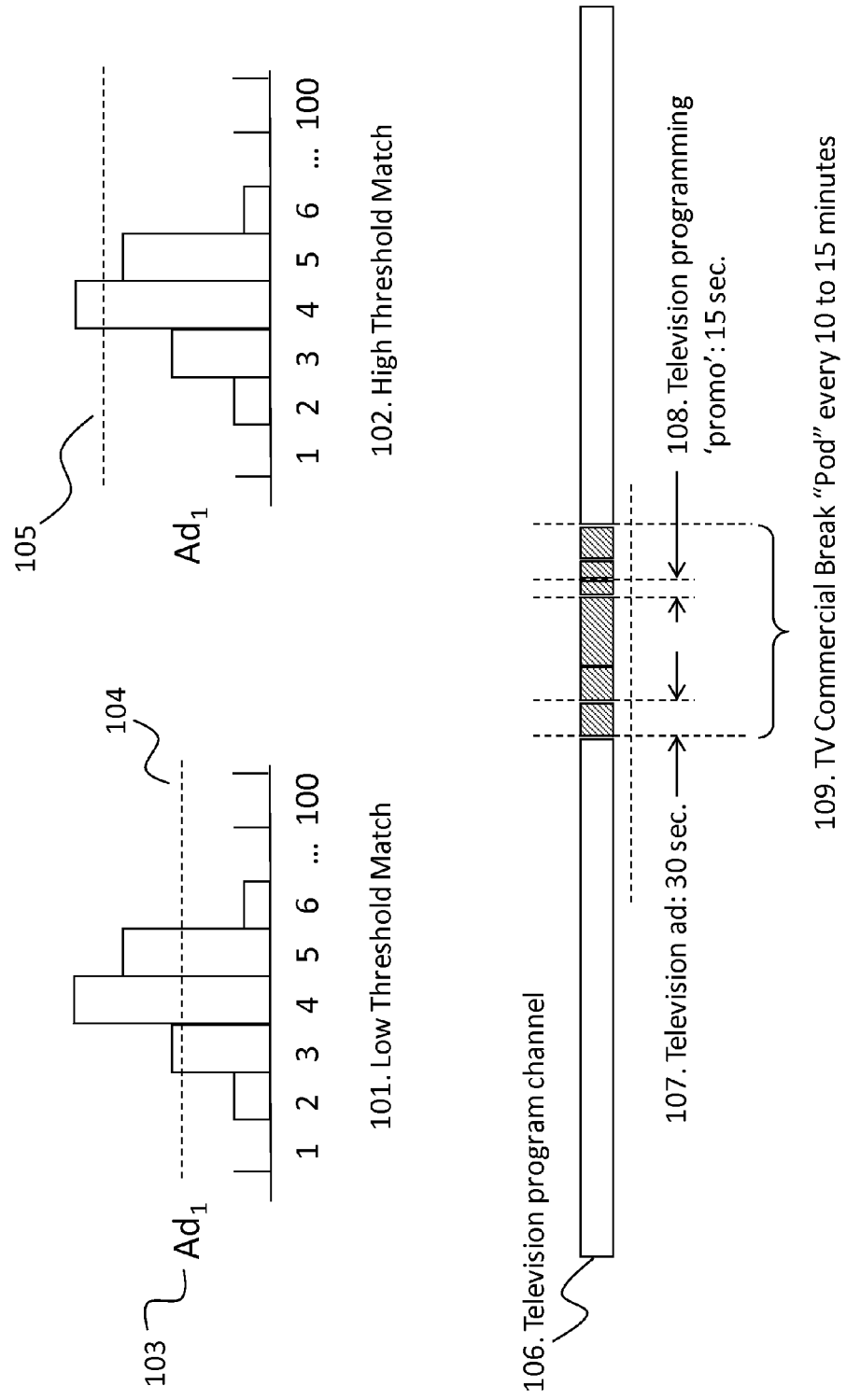
FIG. 1 illustrates a typical advertising break (or ad pod) on a time scale highlighting how commercial messages may be spotted. Commercials may be initially detected if their duration falls within certain parameters (104 Low Threshold) and then confirmed with high confidence if the suspect segment matches a certain existing commercial's finger prints in the database 135.

One of the problems of maintaining a database of video fingerprints for automated content recognition (ACR) systems is that content ingested from a live television broadcast contains a high percentage of television commercials. Commercials, by their nature, repeat and said content quickly fills a reference (matching) database with many instances of the same said content. FIG. 1 illustrates a typical television program channel 106 with an advertisement break 109, known in the television industry as an "ad pod," which typically contains many segments of different lengths of: television ads, public service announcements, and upcoming programming promotions, among other material. A typical television ad 107 is 30 seconds in duration. A typical television programming promotion is 15 seconds in duration. The total length of the ad pod 139 typically varies from 60 seconds to three minutes in total duration. Ad pods and other non-program material occupy more than 33% of an average television programming hour.

This large quantity of repeating content can cause an ACR system to generate a considerable number of false positive matches or conversely to find no match at all. In one case, this is because of the repetition of a commercial in the course of the same television programming as well as the repetition of a particular commercial in many different television programs on many different television channels. Hence, when an unknown video source contains television commercial fingerprints (cues), a database with a high percentage of television commercials, will result in many matches throughout the database proportional to the percentage of repetition of said commercial yielding unusable results for the duration of a repeated commercial.

However, there is a problem determining whether two fingerprints in the reference database which repeat do so because they match content or because they represent a poor match that should be ignored. To mitigate this problem this invention introduces an algorithm that detects commercials and other frequently repeating segments of video, such as upcoming programming promos. The basic premise of this algorithm is that commercials are short in duration, repeat many times on a given television channel and repeat across multiple television channels.

Once a segment of video is flagged as a commercial, it is stripped from the main database and stored in a separate television commercial database. In addition to cleaning up the primary television programming database this also adds the useful feature that specific commercials can be detected without having to load them independently into the main advertising database.

Figure 2:
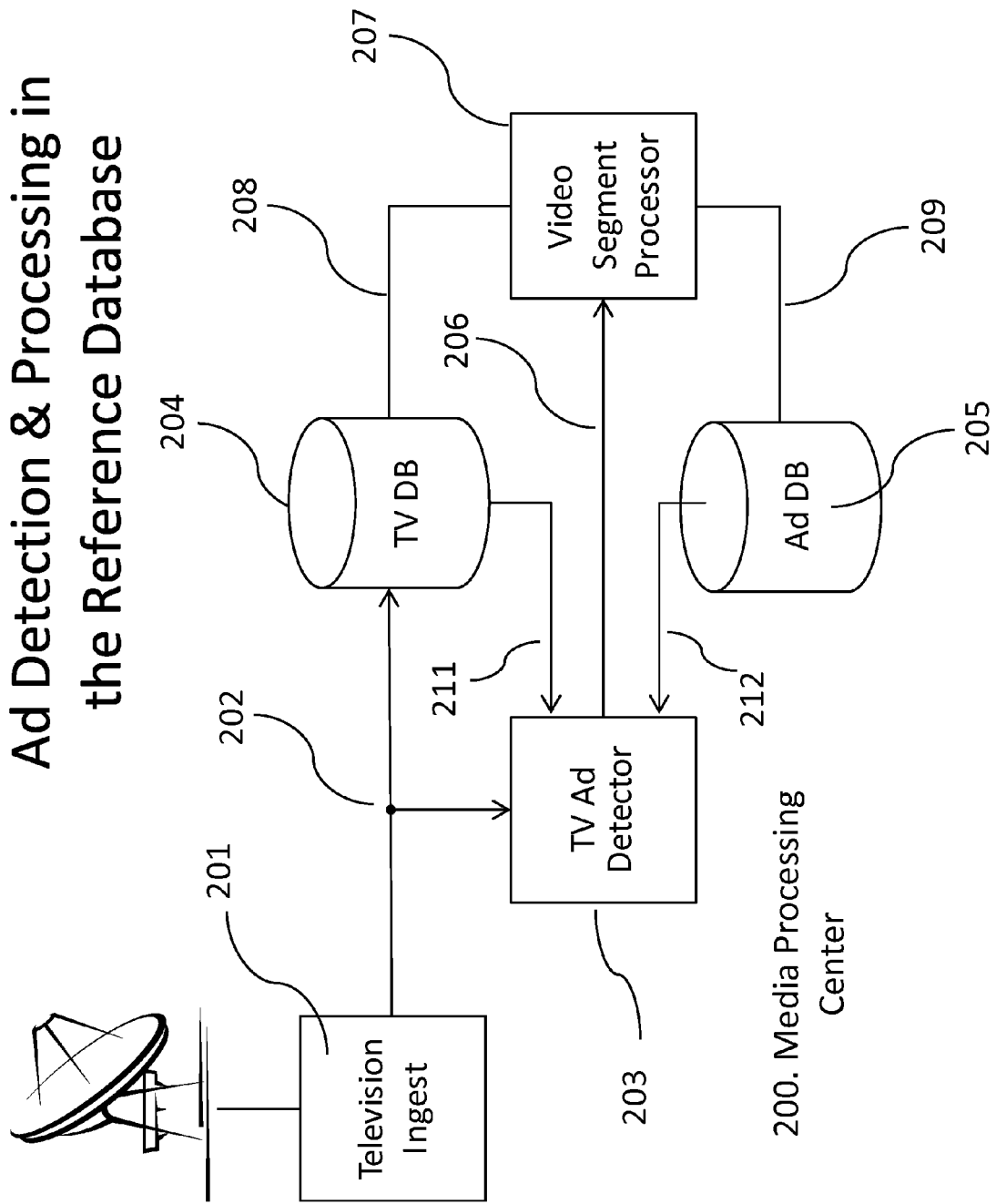
FIG. 2 illustrates how the various components of the system interact enabling separate databases of television programming and commercial messages to be built, maintained, and utilized in a manner that enables the reliable real time identification of advertising messages.

The television advertisement detection process works as follows: As seen in FIG. 2, television program feeds are uploaded processed and output via 202 into the primary matching system database 204 and also sent to the television commercial video detector 203. For each television channel monitored by the invention, there is an instance of the television commercial detector of the invention.

The television commercial detector runs a content search process on the incoming feed typically located with the central server means of the invention. This is similar to the process of the invention operating in a connected TV in a user's home where said invention reads pixel patches from one or more screen locations at a prescribed number of samples per time interval. As with the home application, said process further performs numerical processing on said pixel patches to prepare said patches for input to a content matching system which will attempt to match said pixel arrays to a database of known content.

Unlike the application of the invention operating in an enabled TV, the commercial detector content search process continues to search for every possibility match until a matching threshold is reached and the process for that match set ceases. This is different from regular content search in that typically a content search that returns multiple matches is considered to be invalid, because fixed length segments typically do not repeat within the body of a television program. This advertisement search process runs continuously and examines the video from every television program source that is fed to the system of the invention.

For each possible match returned from the above process, the following process is triggered asynchronously allowing the above mentioned algorithm to continue searching while the following process executes in three steps:

Step 1: Each possible match is evaluated for length which should be larger than a given threshold, for example, 5 seconds, and smaller then another, perhaps 60 seconds. In FIG. 1, this is both a duration, as illustrated in 109, and a low threshold match 101. In practice, this is simply the difference between the timestamp of the first matching point and the last matching point for segments about the predetermined threshold 104 as per the method as disclosed in U.S. Pat. No. 8,585,781.

Step 2: If the possible match is within the acceptable parameters of the previous test (step 1) it is then run through the content search again but with more refined test requirements where the same search is performed as previously but requiring the points (fingerprints) of the two samples to match more closely as in 105. The results of this test are evaluated and if the percentages of points (fingerprints) that match this stricter search are less than a given threshold, the possible match is discarded.

Step 3: If the possible match passes the previous test it is then run through yet another content search but with much looser configuration, i.e. the same search as before but allowing each point of the two samples to be farther apart, perhaps in at least one of time or distance. The results of this test help identify the borders of the suspected television commercial and are evaluated to have no missing points (i.e. all points in the two samples match) and to have beginning and end boundaries that are within a time threshold of the originally suspected commercial (i.e. if the original possible match was 15 seconds long then the results of the loose content search can't be 30 seconds long, etc.)

Referencing FIG. 2, if an unknown video segment sample passes all three tests above then it is assumed to be a television commercial, promotion or public service announcement and information defining said video segment is sent via 206 to the video segment processor 207. If said sample has matched against a television commercial, promotion or public service announcement already in the ad database 205, then the new instance is removed from the primary television program database 204 by the video segment processor 207 and there is no need to place said matched advertisement again in the ad database. If said sample has matched against primary television program content then that segment of the television program during which the unknown segment has matched is considered an ad and both instances, the new programming coming into the system as well as the matched ad already in the TV database 204, are removed and a new commercial is entered into the ad database 205 in their place.

Figure 3:
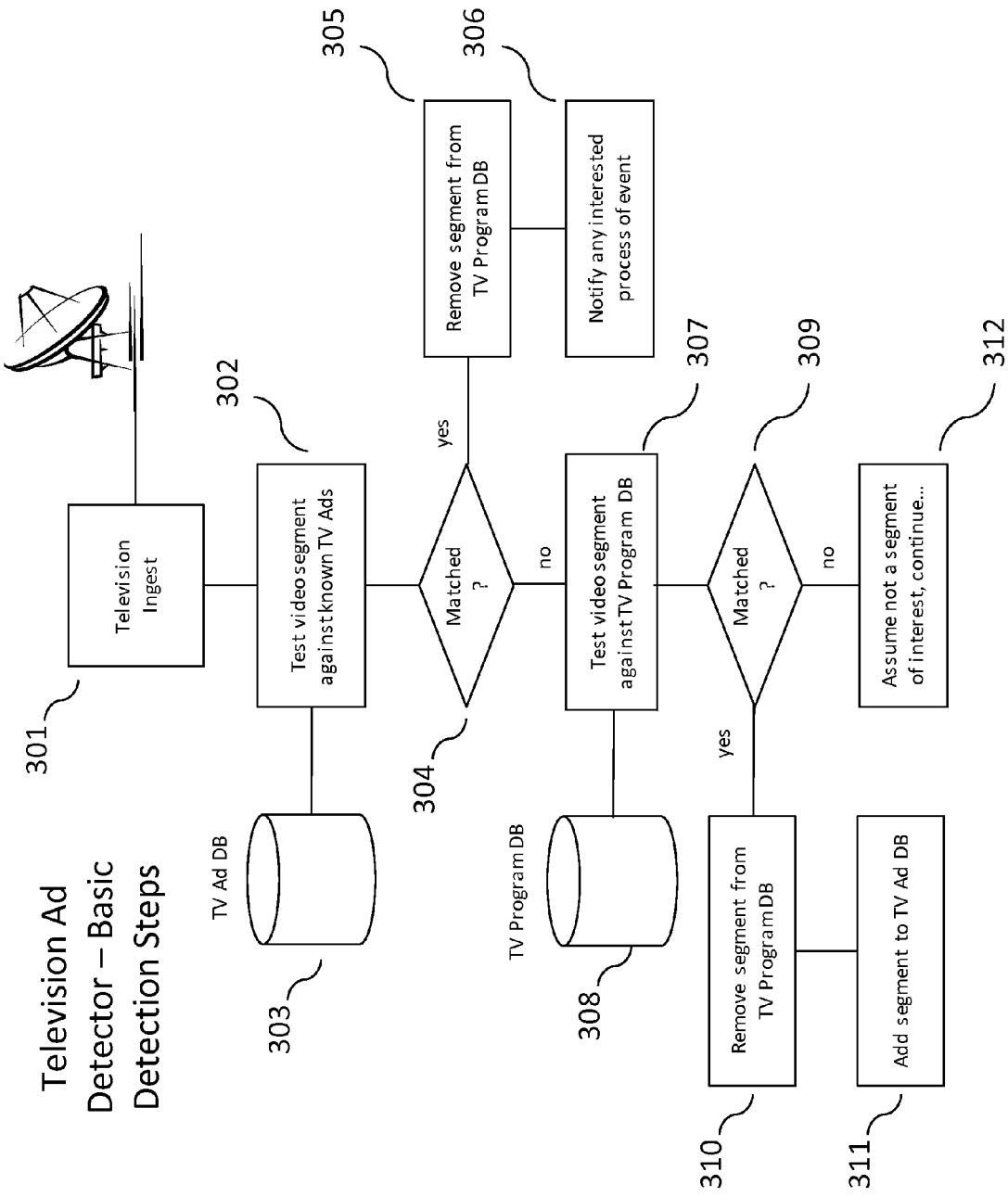
FIG. 3 illustrates a flow chart summarizing the order of the individual steps of the method and how they interrelate.
Figure 4:
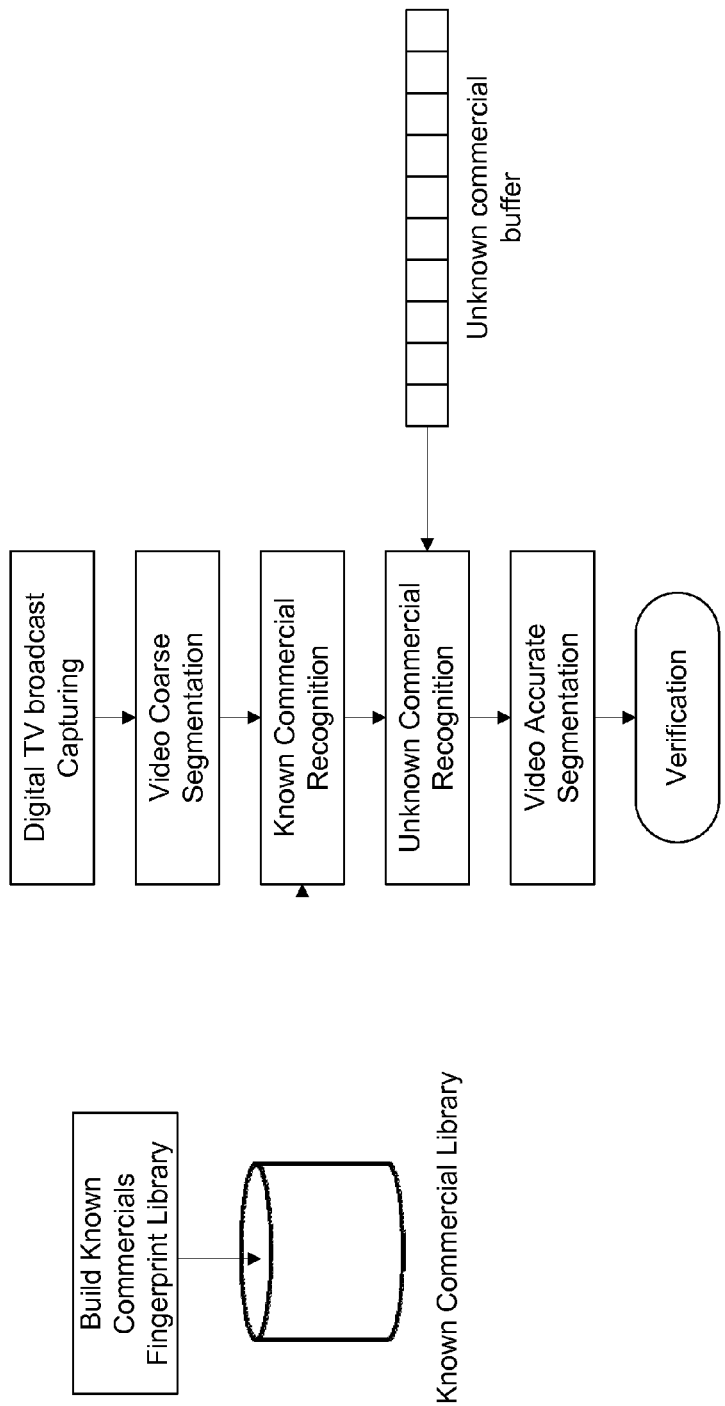
FIG. 4 illustrates a prior art flow diagram.

A flow chart summarizing the method is presented in FIG. 3. Each television video stream or "channel" is accepted by system 301 and initially tested against an existing database of known commercials, 303. If there is a match, 304, it is removed from the database of TV programming, 308. If there is not a match, it is tested, 307, against the database of known TV programs 308. If it is a match, the video segment matching it is removed from the TV program database, 310 and added to the TV commercial database 311. If it is not a match, then it is assumed to not be a segment of interest 312, and is ignored. FIG. 4 illustrates a prior art flow diagram for comparison.

Figure 5:
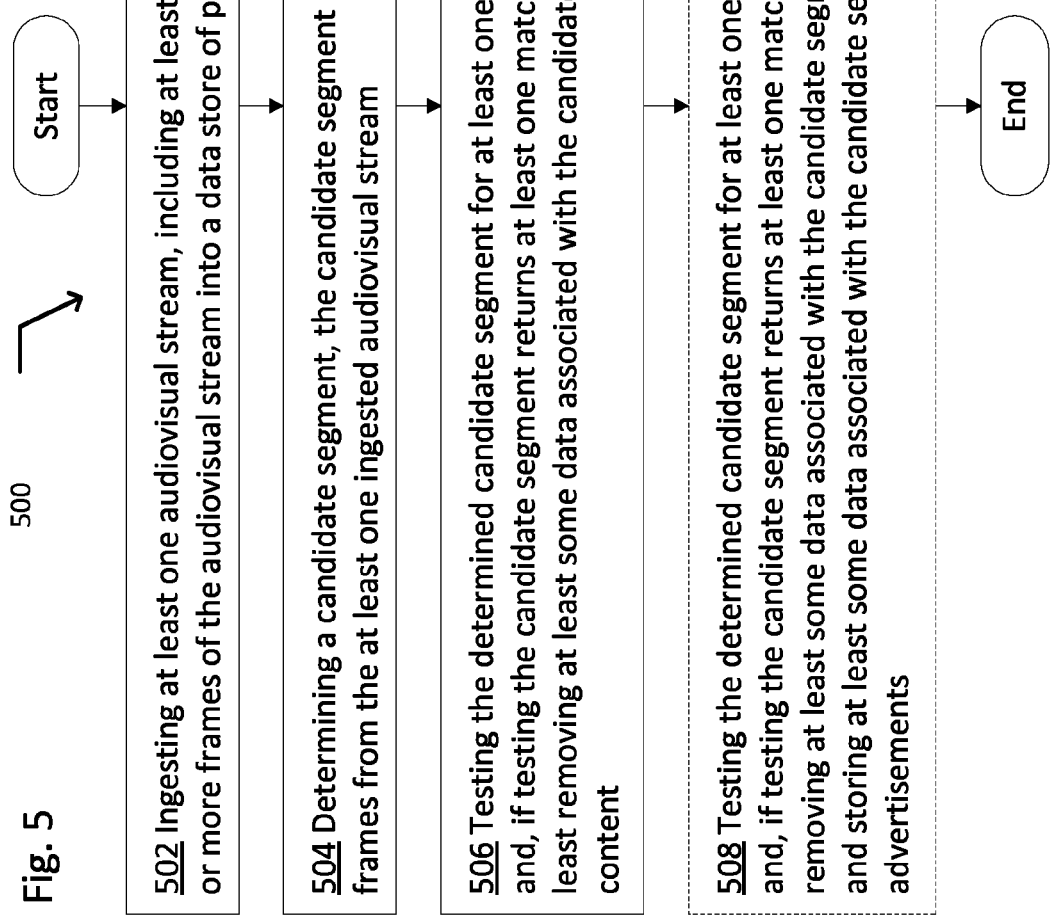
FIG. 5 illustrates an operational flow representing example operations related to real-time television ad detection using an automated content recognition database.

FIG. 5 illustrates an operational flow 500 representing example operations related to real-time television ad detection using an automated content recognition database. In FIG. 5 and in following figures that include various examples of operational flows, discussion and explanation may be provided with respect to the above-described examples of FIGS. 1 through 3, and/or with respect to other examples and contexts. However, it should be understood that the operational flows may be executed in a number of other environments and contexts, and/or in modified versions of FIGS. 1 through 3. Also, although the various operational flows are presented in the sequence(s) illustrated, it should be understood that the various operations may be performed in other orders than those which are illustrated, or may be performed concurrently.

After a start operation, the operational flow 500 moves to operation 502. Operation 502 depicts ingesting at least one audiovisual stream, including at least storing at least some data associated with one or more frames of the audiovisual stream into a data store of program content. For example, as shown in and/or described with respect to FIGS. 1 through 3, incoming audiovisual data streams containing programming and advertisement content may be downlinked from satellites to which a national network broadcast center for a channel has uplinked the data stream. Data streams may also be received from other sources, e.g. via downlinking from other sources, received via a fiber optic connection, received using conventional VHF, UHF, or microwave antennas, received over a data network such as the internet, etc. Data associated with the data streams may be stored in a media data store which may also be known as a primary matching system database.

The operations by which the data associated with the data streams may be stored in a media data store may include operations described in a parent application, U.S. patent application Ser. No. 12/788,721 (now U.S. Pat. No. 8,595,781), "METHODS FOR IDENTIFYING VIDEO SEGMENTS AND DISPLAYING CONTEXTUAL TARGETED CONTENT ON A CONNECTED TELEVISION" ("the '781 patent"); and/or in related U.S. patent application Ser. No. 14/217,039, "SYSTEMS AND METHODS FOR ADDRESSING A MEDIA DATABASE USING DISTANCE ASSOCIATIVE HASHING" filed concurrently with the instant application and/or in related U.S. patent application Ser. No. 14/217,075, "SYSTEMS AND METHODS FOR IDENTIFYING VIDEO SEGMENTS FOR DISPLAYING CONTEXTUALLY RELEVANT CONTENT" ("the related applications").

Then, operation 504 depicts determining a candidate segment, the candidate segment including at least one or more sequential frames from the at least one ingested audiovisual stream. For example, as shown in and/or described with respect to FIGS. 1 through 3, following ingestion of the audiovisual data stream, a possible match is chosen, perhaps via a content search process on the incoming feed. The possible match may represent any contiguous segment of frames having just been ingested on any channel feed for which a similar or identical contiguous segment of frames already exists in the media content database. The possible match may represent an advertisement (duplicates of which in a media content database without an advertisement detection means would be expected as ads repeat frequently) or another short segment of interest such as a public service announcement. The possible match may then be evaluated via a three step process which may include evaluating a possible match for length, evaluating a possible match against the already-existing segment of frames for closeness of fingerprints using more rigorous matching requirements, and evaluating the possible match against the already-existing frames for closeness of fingerprints using less rigorous matching requirements, helping to identify borders of the possible match. The possible match is returned as a candidate segment Then, operation 506 depicts testing the determined candidate segment for at least one match in a data store of known advertisements and, if testing the candidate segment returns at least one match in the data store of known advertisements, at least removing at least some data associated with the candidate segment from the data store of program content. For example, as shown in and/or described with respect to FIGS. 1 through 3, if data associated with the candidate segment matches data associated with a known ad that is stored in an ad database, the data associated with the candidate segment having been ingested is removed from the media content database. The operational flow may then proceed to an end operation.

FIG. 5 also illustrates an alternative embodiment of the example operational flow 500. FIG. 5 illustrates an example embodiment where operational flow 500 may include at least one additional operation 508.

Operation 508 illustrates testing the determined candidate segment for at least one match in the data store of program content and, if testing the candidate segment returns at least one match in the data store of program content, at least removing at least some data associated with the candidate segment from the data store of program content and storing at least some data associated with the candidate segment in the data store of known advertisements. For example, as shown in and/or described with respect to FIGS. 1 through 3, if the result of operation 506 is that the candidate segment suspected to be an ad is not previously known via checking the ad database, data associated with the candidate segment is checked against the media content database. If the candidate segment suspected to be an ad is also found in the media content database, the data associated with the segment found in the media content database is removed. Further, the data associated with the segment is placed in the data store of known advertisements. The operational flow may then proceed to an end operation.

Figure 6:
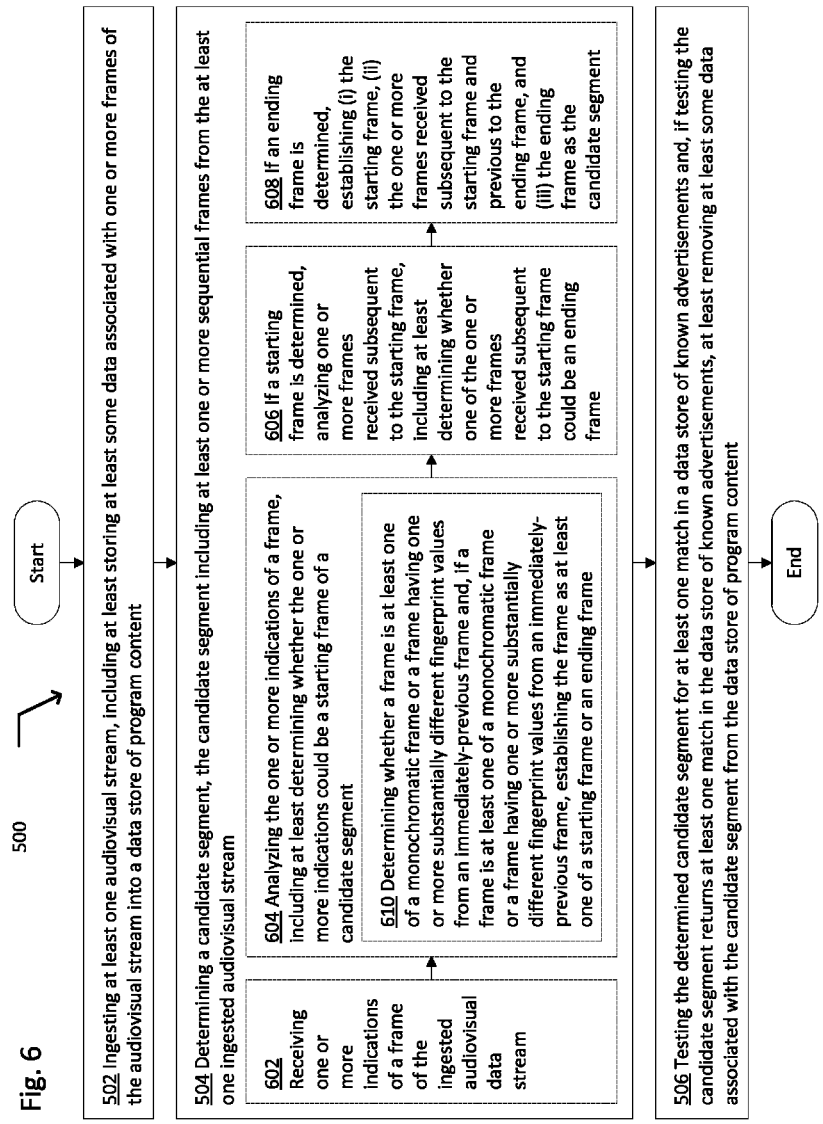
FIG. 6 illustrates an alternative embodiment of the operational flow of FIG. 5.

FIG. 6 illustrates alternative embodiments of the example operational flow 500 of FIG. 5. FIG. 6 illustrates an example embodiment where operation 502 may include at least one additional operation. Additional operations may include operation 602, operation 604, operation 606, and/or operation 608.

Operation 602 illustrates receiving one or more indications of a frame of the ingested audiovisual data stream. For example, as shown in and/or described with respect to FIGS. 1 through 3, data associated with a particular frame from the incoming data stream is selected.

Further, operation 604 illustrates analyzing the one or more indications of a frame, including at least determining whether the one or more indications could be a starting frame of a candidate segment. For example, as shown in and/or described with respect to FIGS. 1 through 3, the data associated with the particular frame may be checked for the presence of particular signatures which would indicate that the particular frame could be the start of a commercial.

Further, operation 606 illustrates if a starting frame is determined, analyzing one or more frames received subsequent to the starting frame, including at least determining whether one of the one or more frames received subsequent to the starting frame could be an ending frame. For example, as shown in and/or described with respect to FIGS. 1 through 3, if signatures are detected that suggest the frame may be the first frame of a commercial, the process begins analyzing successive frames received subsequent to the purported starting frame to see whether any of the successive frames might include the particular signatures.

Further, operation 608 illustrates if an ending frame is determined, establishing (i) the starting frame, (ii) the one or more frames received subsequent to the starting frame and previous to the ending frame, and (iii) the ending frame as the candidate segment. For example, as shown in and/or described with respect to FIGS. 1 through 3, when a purported starting frame and ending frame are determined, those frames and all intermediate frames concatenated together may be a candidate segment.

Further, FIG. 6 illustrates a further alternative embodiment of the operation 604. Operation 604 may include at least one additional operation 610.

Operation 610 illustrates determining whether a frame is at least one of a monochromatic frame or a frame having one or more substantially different fingerprint values from an immediately-previous frame and, if a frame is at least one of a monochromatic frame or a frame having one or more substantially different fingerprint values from an immediately-previous frame, establishing the frame as at least one of a starting frame or an ending frame. For example, as shown in and/or described with respect to FIGS. 1 through 3, a signature suggesting a frame may be a starting frame include that the frame is monochromatic (e.g. solid black, solid white), as commercials often begin with one or more all black frames, for example. Alternatively, a starting frame for a commercial could be represented by a "scene change." In other words, two successive commercials, or a program followed by a commercial, most likely include differing scenes. When the contents of a frame vary significantly from the contents of the previous frame, it may indicate a scene change, which may represent a transition from a program to a commercial or a transition between commercials. Detecting a significant difference between two frames may be accomplished at least partially by one or more operations disclosed in the '781 patent and/or the related applications. Notably, a scene change is not dispositive of a commercial alone, merely that such a frame might represent a starting frame. Other operations described herein may assist in continuing to assess whether a segment identified by the first frame having a scene change is actually a commercial, so even if a scene change represents a change of from one scene to another inside of a program, and not from a program to a commercial, later tests will discard the segment starting with the scene change as a commercial.

The same signatures described with respect to operation 610 may also apply to determining whether a frame may be an ending frame in operation 606.

Figure 7:
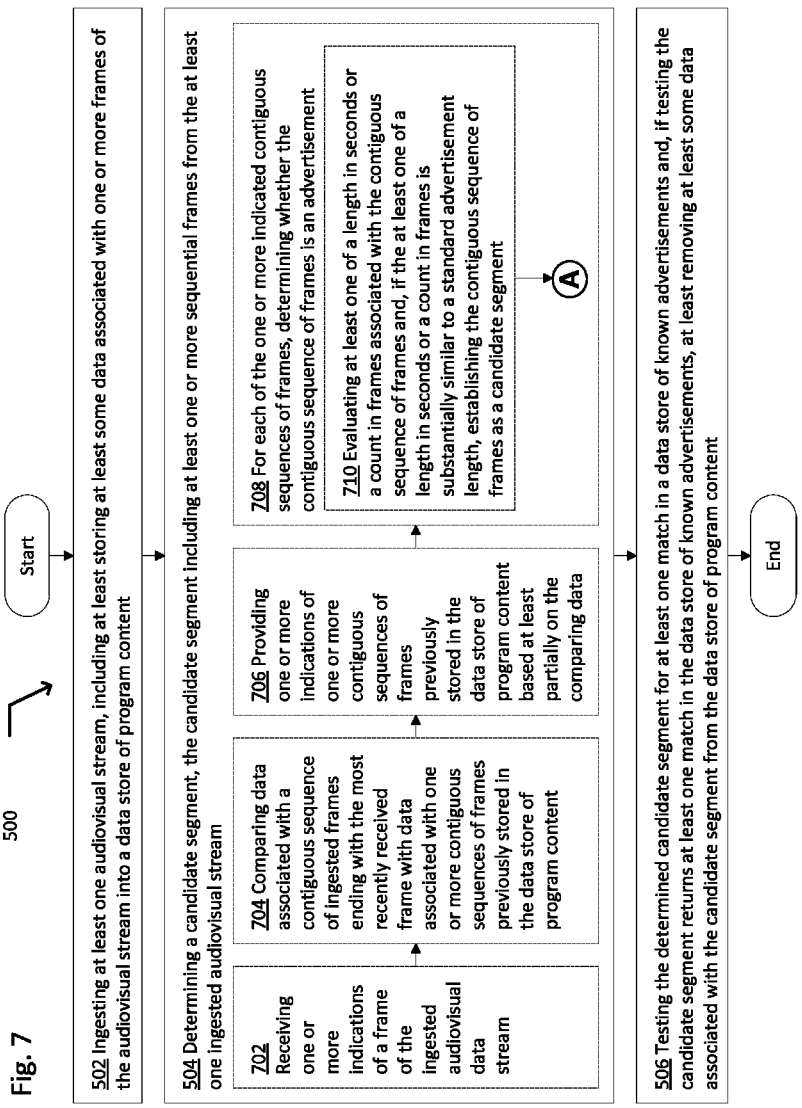
FIG. 7 illustrates an alternative embodiment of the operational flow of FIG. 5.

FIG. 7 illustrates alternative embodiments of the example operational flow 500. FIG. 7 illustrates an example embodiment where operation 504 may include at least one additional operation. Additional operations may include operation 702, operation 704, operation 706 and/or operation 708.

Operation 702 illustrates receiving one or more indications of a frame of the ingested audiovisual data stream. For example, as shown in and/or described with respect to FIGS. 1 through 3, data associated with a particular frame from the incoming data stream is selected.

Further, operation 704 illustrates comparing data associated with a contiguous sequence of ingested frames ending with the most recently received frame with data associated with one or more contiguous sequences of frames previously stored in the data store of program content. For example, as shown in and/or described with respect to FIGS. 1 through 3, data associated with a segment of contiguous frames having just been ingested and ending in the particular frame is checked against the media content data store to determine whether there are any segments of contiguous frames in the data store which may match the segment just ingested and ending in the particular frame.

Further, operation 706 illustrates providing one or more indications of one or more contiguous sequences of frames previously stored in the data store of program content based at least partially on the comparing data. For example, as shown in and/or described with respect to FIGS. 1 through 3, the matching operation 704 may return data associated with one or more at least partially matching contiguous segments. Matches, or partial matches, of a contiguous segment of frames having just been ingested with one or more contiguous segments of frames in the media content database may indicate that the contiguous segment of frames having just been ingested may be a commercial. So, too, may be the at least partially matched one or more contiguous segments of frames in the media content database. Importantly, for performance reasons, the matching operation does not search the media content database for exact, frame-by-frame and pixel-by-pixel matches. Rather, suspected matches are returned from the media content database that are at least partially related to the segment just ingested, the matching and/or returning perhaps via operations disclosed in the '781 patent and/or the related applications.

Further, operation 708 illustrates for each of the one or more indicated contiguous sequences of frames, determining whether the contiguous sequence of frames is an advertisement. For example, as shown in and/or described with respect to FIGS. 1 through 3, one or more tests may be applied to the contiguous sequence of frames, which is at this stage a suspected or purported advertisement, the one or more tests applied to confirm the suspicion that the contiguous sequence of frames is an advertisement.

Further, FIG. 7 illustrates a further alternative embodiment of the operation 708. Operation 708 may include at least one additional operation 710.

Operation 710 illustrates evaluating at least one of a length in seconds or a count in frames associated with the contiguous sequence of frames and, if the at least one of a length in seconds or a count in frames is substantially similar to a standard advertisement length, establishing the contiguous sequence of frames as a candidate segment. For example, as shown in and/or described with respect to FIGS. 1 through 3, the contiguous sequence of frames representing the purported advertisement is checked for length. If the length is near a common advertisement length (e.g., 30 seconds, 15 seconds, 60 seconds, or other common ad lengths), then the contiguous sequence of frames may still be considered a suspected advertisement. If the length is not near a common advertisement length (e.g. 52 seconds), then the contiguous sequence of frames is considered less likely to be an advertisement and/or is no longer considered to be an advertisement. Alternatively, if the number of frames in the contiguous sequence of frames is near a number of frames commonly used in an advertisement, then the contiguous sequence of frames may still be considered a suspected advertisement. A common number of frames may be, for example, 29.997 frames per second times 30 seconds, or approximately 900 frames. The tested length may be exactly the duration or number of frames commonly used in an advertisement, or may be near the duration or number of frames commonly used in an advertisement (within two or three seconds, or within 60-90 frames, e.g.). A matching algorithm used to return candidates from a media content database may return candidates which do not have exactly the same contiguous length (e.g. they may be missing frames at the beginning or end of the contiguous segment or may include extra frames at the beginning or end of the contiguous segment, perhaps due to matching processes invoked which may include path pursuit and/or PPLEB, for example). Operation 710 may represent at least a portion of Step 1 disclosed elsewhere herein.

Figure 8:
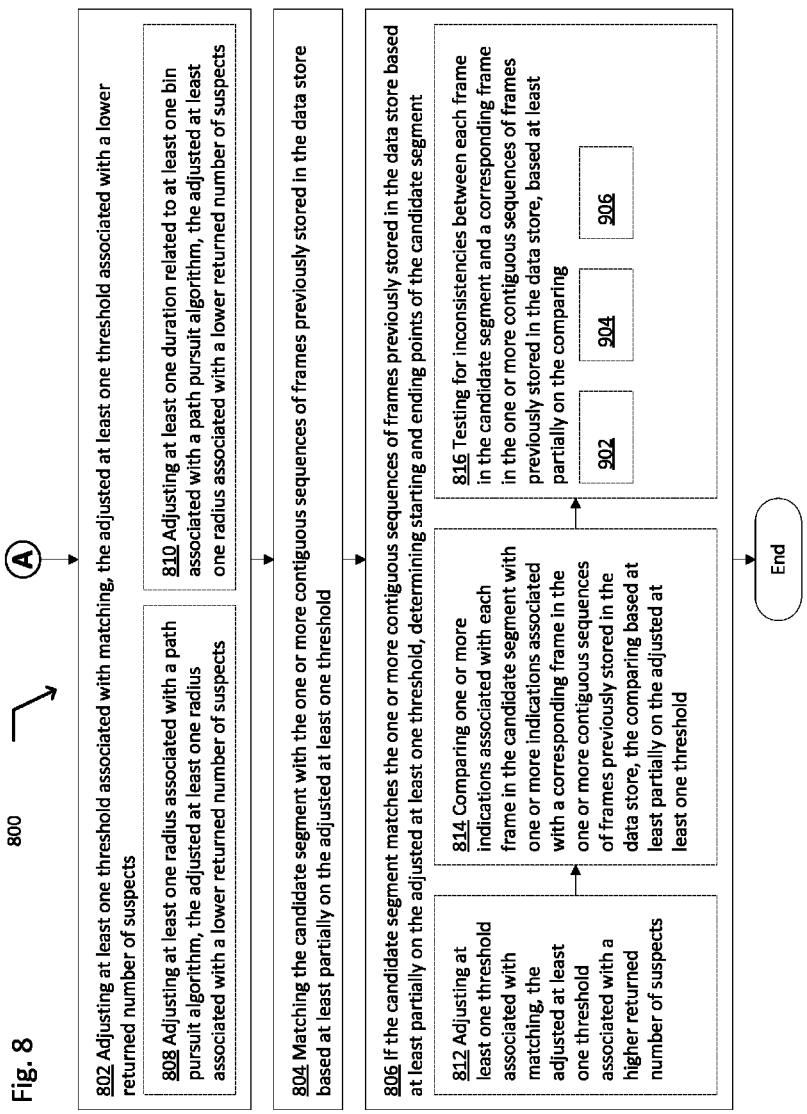
FIG. 8 illustrates an alternative embodiment of the operational flow of FIG. 5.

FIG. 8 illustrates an operational flow 800 representing further alternative example operations continuing the example operational flow 500 of FIG. 5. Operational flow 800 may include operation 802, operation 804, and/or operation 806.

Operation 802 illustrates adjusting at least one threshold associated with matching, the adjusted at least one threshold associated with a lower returned number of suspects. For example, as shown in and/or described with respect to FIGS. 1 through 3, matching of data associated with the suspected advertisement and data associated with the one or more contiguous segments returned from the media content database is compared again for one or more possible matches. In contrast to the initial operation which retrieved matches from the relatively large media content database using loose tolerances for matching for the sake of performance (perhaps via operations disclosed via the '781 patent and/or the related applications), additional matching may be completed comparing the purported advertisement with a relatively small number of search results, the additional matching completed using tighter tolerances for matching (again, perhaps via operations disclosed via the '781 patent and/or the related applications). Matching using tighter tolerances may be associated with more computationally-intensive operations; however, when used to compare smaller numbers of segments, the additional computational burden is within acceptable limits.

Further, operation 804 illustrates matching the candidate segment with the one or more contiguous sequences of frames previously stored in the data store based at least partially on the adjusted at least one threshold. For example, as shown in and/or described with respect to FIGS. 1 through 3, the matching operation of the data associated with the purported advertisement with the data associated with the possible matches is completed with the tighter tolerances established in operation 802. Operations 802 and 804 may represent at least a portion of Step 2 disclosed elsewhere herein. One or more of the possible matches previously returned may be removed from the retrieved matches based at least partially on the matching with tighter tolerance.

Further, operation 806 illustrates if the candidate segment matches the one or more contiguous sequences of frames previously stored in the data store based at least partially on the adjusted at least one threshold, determining starting and ending points of the candidate segment. For example, as shown in and/or described with respect to FIGS. 1 through 3, any matches previously retrieved from the media content database are checked against the purported advertisement again. An effect of this additional check may be to identify the boundaries of the purported commercial (i.e. to trim any superfluous frames from the beginning or end of the purported commercial or add back any missing frames from the beginning or end of the purported commercial, both via the comparison with the matches previously retrieved from the media content database). Operation 806 may, at least partially, be related to Step 3 disclosed elsewhere herein.

FIG. 8 further illustrates an example embodiment where operation 802 may include at least one additional operation. Additional operations may include operation 808 and/or operation 810.

Operation 808 illustrates adjusting at least one radius associated with a path pursuit algorithm, the adjusted at least one radius associated with a lower returned number of suspects. For example, as shown in and/or described with respect to FIGS. 1 through 3, the tolerance may be made tighter via adjusting a radius associated with PPLEB searching and/or a path pursuit algorithm, perhaps via operations disclosed in the '781 patent and/or the related applications.

Further, operation 810 illustrates adjusting at least one duration related to at least one bin associated with a path pursuit algorithm, the adjusted at least one radius associated with a lower returned number of suspects. For example, as shown in and/or described with respect to FIGS. 1 through 3, the tolerance may be made tighter via adjusting a duration radius associated with PPLEB searching and/or a path pursuit algorithm, perhaps via operations disclosed in the '781 patent and/or the related applications. The duration may, for example, relate to the amount of time before tokens are dropped from time bins in a time discount binning arrangement. The duration may, for example, relate a time-to-live value associated with one or more tokens of time bins in a time discount binning arrangement.

FIG. 8 further illustrates an example embodiment where operation 806 may include at least one additional operation. Additional operations may include operation 812, operation 814, and/or operation 816.

Operation 812 illustrates adjusting at least one threshold associated with matching, the adjusted at least one threshold associated with a higher returned number of suspects. For example, as shown in and/or described with respect to FIGS. 1 through 3, tolerances adjusted to be tighter in operation 802 are loosened for additional matching which likely includes matching the purported advertisement with fewer retrieved matches from the media content database owing to the removal of retrieved matches via the tighter tolerance match of operation 804.

Further, operation 814 illustrates comparing one or more indications associated with each frame in the candidate segment with one or more indications associated with a corresponding frame in the one or more contiguous sequences of frames previously stored in the data store, the comparing based at least partially on the adjusted at least one threshold. For example, as shown in and/or described with respect to FIGS. 1 through 3, the purported advertisement and the remaining matches are compared again using the looser tolerance(s) (e.g. radius, duration, others described in the '781 patent or related applications, etc.).

Further, operation 816 illustrates testing for inconsistencies between each frame in the candidate segment and a corresponding frame in the one or more contiguous sequences of frames previously stored in the data store, based at least partially on the comparing. For example, as shown in and/or described with respect to FIGS. 1 through 3, boundaries of the purported advertisement may be more accurately determined during this test in which each point of the two samples may be farther apart, perhaps in time or distance, for example.

Figure 9:
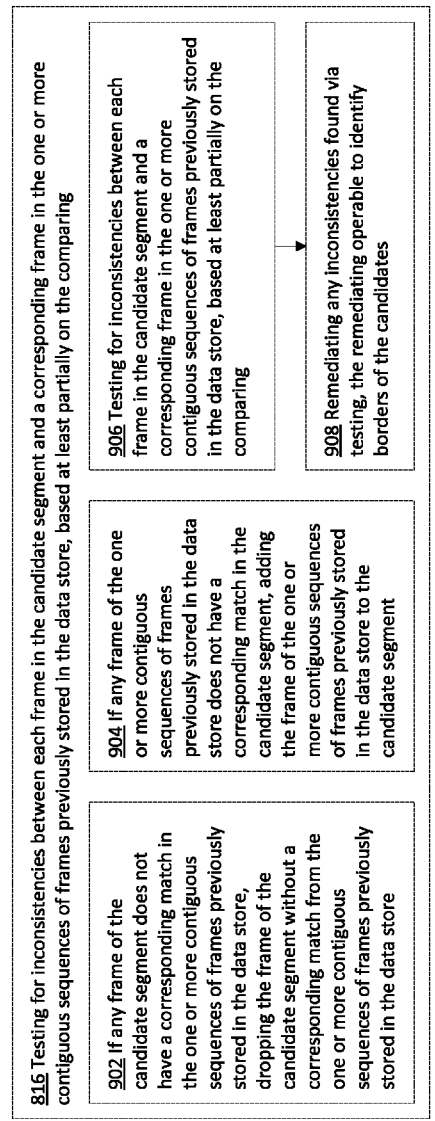
FIG. 9 illustrates an alternative embodiment of the operational flow of FIG. 5.

FIG. 9 illustrates a further alternative embodiment of the operation 816, which may include at least one additional operation. Operation 816 may include operation 902, operation 904, operation 906, and/or operation 908.

Operation 902 illustrates if any frame of the candidate segment does not have a corresponding match in the one or more contiguous sequences of frames previously stored in the data store, dropping the frame of the candidate segment without a corresponding match from the one or more contiguous sequences of frames previously stored in the data store. For example, as shown in and/or described with respect to FIGS. 1 through 3, excess frames, perhaps at the beginning or end of the purported advertisement, or perhaps in the middle of the purported advertisement, which do not have a corresponding match in the segment retrieved from the media content database may be dropped.

Operation 904 illustrates if any frame of the one or more contiguous sequences of frames previously stored in the data store does not have a corresponding match in the candidate segment, adding the frame of the one or more contiguous sequences of frames previously stored in the data store to the candidate segment. For example, as shown in and/or described with respect to FIGS. 1 through 3, frames found in the segment retrieved from the media content database which do not have a corresponding match in the purported advertisement may be added to the segment representing the purported advertisement, perhaps at the beginning or end of the purported advertisement and/or the middle of the purported advertisement.

Operation 906 testing for inconsistencies between each frame in the candidate segment and a corresponding frame in the one or more contiguous sequences of frames previously stored in the data store, based at least partially on the comparing. For example, as shown in and/or described with respect to FIGS. 1 through 3, the purported advertisement is compared with the one or more surviving matches retrieved from the media content database which passed through steps 1 and 2 for any inconsistencies between them, which may comprise at least a portion of Step 3 disclosed elsewhere herein.

Operation 908 illustrates remediating any inconsistencies found via testing, the remediating operable to identify borders of the candidates. For example, as shown in and/or described with respect to FIGS. 1 through 3, the results of operation 906 help identify the borders of the suspected television commercial and are evaluated to have no missing points (i.e. all points in the two samples match) and to have beginning and end boundaries that are within a time threshold of the originally suspected commercial (i.e. if the original possible match was 15 seconds long then the results of the loose content search can't be 30 seconds long, etc.).

Figure 10:
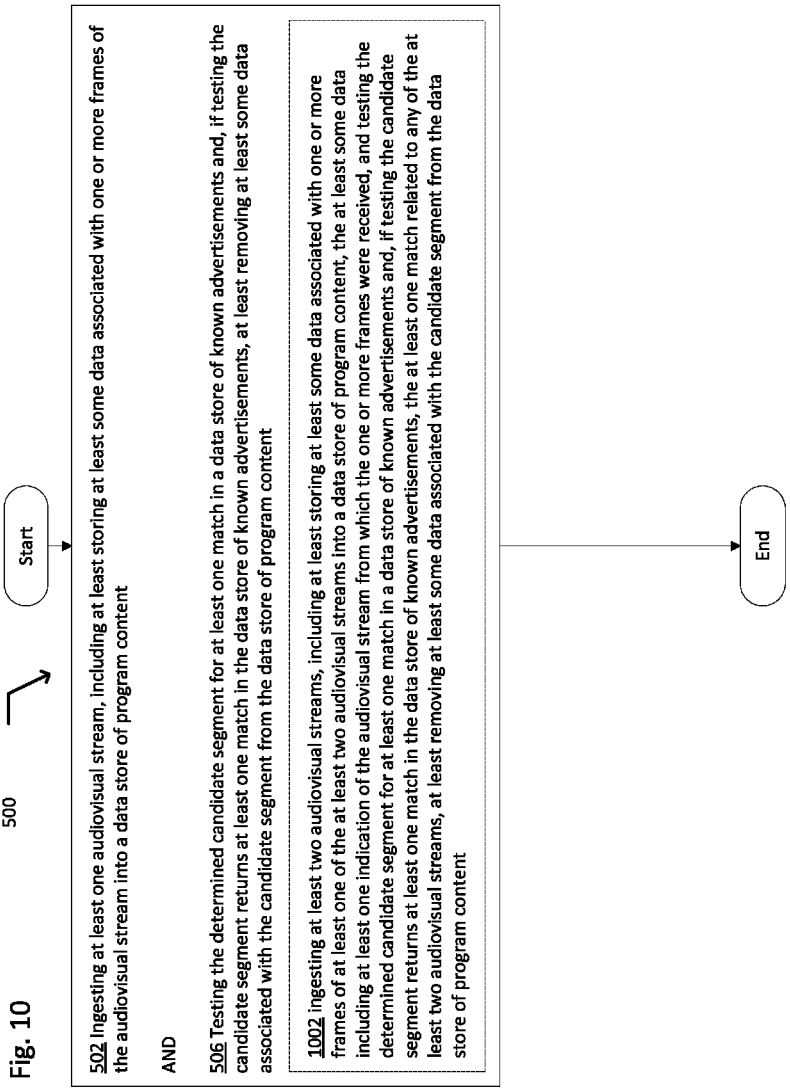
FIG. 10 illustrates an alternative embodiment of the operational flow of FIG. 5.

FIG. 10 illustrates alternative embodiments of the example operational flow 500 of FIG. 5. FIG. 6 illustrates an example embodiment where operation 502 and operation 506 may include at least one additional operation. Additional operations may include operation 1002.

Operation 1002 illustrates ingesting at least two audiovisual streams, including at least storing at least some data associated with one or more frames of at least one of the at least two audiovisual streams into a data store of program content, the at least some data including at least one indication of the audiovisual stream from which the one or more frames were received, and testing the determined candidate segment for at least one match in a data store of known advertisements and, if testing the candidate segment returns at least one match in the data store of known advertisements, the at least one match related to any of the at least two audiovisual streams, at least removing at least some data associated with the candidate segment from the data store of program content. For example, as shown in and/or described with respect to FIGS. 1 through 3, at ingest, more than one channel is downlinked and/or otherwise received and data associated with the data stream from the channel is stored in the media content database, the data associated with each channel downlinked and stored in parallel or substantially in parallel. A particular commercial could be received on any or all of the more than one channel, resulting in potentially many instances of data associated with the particular commercial stored in the media content database. Operations disclosed herein related to determining data associated with advertisements in the media content database may serve to identify and/or process the data associated with the particular advertisement no matter which channel the particular advertisement ran on and/or what time the particular advertisement ran.

Figure 11:
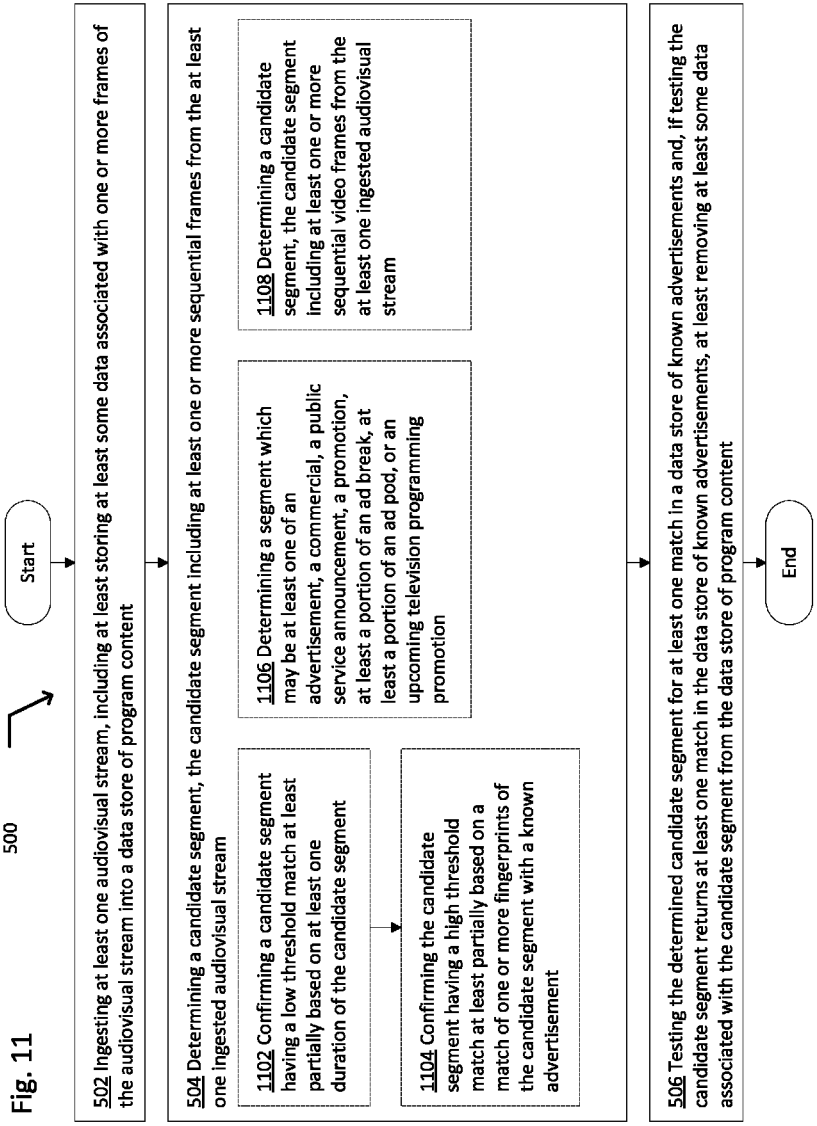
FIG. 11 illustrates an alternative embodiment of the operational flow of FIG. 5.

FIG. 11 illustrates alternative embodiments of the example operational flow 500 of FIG. 5. FIG. 11 illustrates an example embodiment where operation 504 may include at least one additional operation. Additional operations may include operation 1102, operation 1104, operation 11011, and/or operation 1108.

Operation 1102 illustrates confirming a candidate segment having a low threshold match at least partially based on at least one duration of the candidate segment. For example, as shown in and/or described with respect to FIGS. 1 through 3, particularly with respect to step 1, if a purported advertisement (aka a suspected advertisement, suspected commercial, suspected television commercial, suspected television advertisement) has at least one of a duration or a number of frames common to other commercials, the segment may be selected as a purported advertisement as a "low threshold match." Such a desired target duration may be at least five seconds (because commercials of fewer than five seconds are extremely rare or non-existent) and/or less than 60 or 120 seconds (because commercials of longer than 60 or 120 seconds are also extremely rare or non-existent). This is not a dispositive test; rather, the duration or corresponding number of frames is a first indication, with subsequent tests intended to confirm the first indication (i.e. confirm with a high threshold).

Further, operation 1104 illustrates confirming the candidate segment having a high threshold match at least partially based on a match of one or more fingerprints of the candidate segment with a known advertisement. For example, as shown in and/or described with respect to FIGS. 1 through 3, data associated with one or more frames of the purported advertisement (fingerprints, perhaps) is compared with data associated with one or more frames of a possible matching segment in the media content database (again, perhaps fingerprints). The fingerprints and/or comparing may result from operations disclosed in the '781 patent and/or the related operations. One result of comparing the data sets may be a stronger indication, or even a confirmation, that the purported commercial matches the segment from the database (a "high threshold match").

Further, operation 1106 illustrates determining a segment which may be at least one of an advertisement, a commercial, a public service announcement, a promotion, at least a portion of an ad break, at least a portion of an ad pod, or an upcoming television programming promotion. For example, as shown in and/or described with respect to FIGS. 1 through 3, segments of interest disclosed in the instant application may be known as one or more of an advertisement, a commercial, a public service announcement, a promotion, at least a portion of an ad break, at least a portion of an ad pod, or an upcoming television programming promotion. Other nomenclature denoting the segment as a segment of interest for the purposes of this application may exist and all such nomenclature is within the scope of this application.

Further, operation 1108 illustrates determining a candidate segment, the candidate segment including at least one or more sequential video frames from the at least one ingested audiovisual stream. For example, as shown in and/or described with respect to FIGS. 1 through 3, candidate segments of contiguous frames ingested from the data stream can include segments of contiguous video frames. However, it is anticipated that the systems and methods disclosed elsewhere herein could relate to other aspects of a data stream, for example, audio frames, metadata associated with frames of the data stream, or other such embodiments.

FIG. 12 illustrates an exemplary computer program product 1200 which may include at least one non-transitory computer-readable medium. Further illustrated in FIG. 12 are instructions 1204 of computer program product 1200. Instructions 1204 illustrate one or more instructions for ingesting at least one audiovisual stream, including at least storing at least some data associated with one or more frames of the audiovisual stream into a data store of program content; one or more instructions for determining a candidate segment, the candidate segment including at least one or more sequential frames from at least one ingested audiovisual stream; and one or more instructions for testing a determined candidate segment for at least one match in a data store of known advertisements and, if testing the candidate segment returns at least one match in the data store of known advertisements, at least removing at least some data associated with the candidate segment from the data store of program content. For example, as shown in and/or described with respect to FIGS. 1 through 3 and FIGS. 5 through 11, a computer program product may include one or more instructions encoded on and/or stored by one or more non-transitory computer-readable media. The one or more instructions may, when executed by one or more processing devices, cause the one or more processing devices to perform operations including ingesting at least one audiovisual stream, including at least storing at least some data associated with one or more frames of the audiovisual stream into a data store of program content; determining a candidate segment, the candidate segment including at least one or more sequential frames from at least one ingested audiovisual stream; and testing a determined candidate segment for at least one match in a data store of known advertisements and, if testing the candidate segment returns at least one match in the data store of known advertisements, at least removing at least some data associated with the candidate segment from the data store of program content. The foregoing operations may be similar at least in part and/or be substantially similar to (but are not limited to) corresponding operations disclosed elsewhere herein.

FIG. 13 illustrates an exemplary system 1300. System 1300 may include circuitry 1302, circuitry 1304, and/or circuitry 1306.

Circuitry 1302 illustrates circuitry configured for ingesting at least one audiovisual stream, including at least storing at least some data associated with one or more frames of the audiovisual stream into a data store of program content. For example, as shown in and/or described with respect to FIGS. 1 through 3 and 5 through 11, circuitry 1302 may cause operations with an effect similar at least in part and/or substantially similar to (but not limited to) corresponding operations disclosed elsewhere herein.

Then, circuitry 1304 illustrates circuitry configured for determining a candidate segment, the candidate segment including at least one or more sequential frames from at least one ingested audiovisual stream. For example, as shown in and/or described with respect to FIGS. 1 through 3 and 5 through 11, circuitry 1304 may cause operations with an effect similar at least in part and/or substantially similar to (but not limited to) corresponding operations disclosed elsewhere herein.

Then, circuitry 1306 illustrates circuitry configured for testing a determined candidate segment for at least one match in a data store of known advertisements and, if testing the candidate segment returns at least one match in the data store of known advertisements, at least removing at least some data associated with the candidate segment from the data store of program content. For example, as shown in and/or described with respect to FIGS. 1 through 3 and 5 through 11, circuitry 1306 may cause operations with an effect similar at least in part and/or substantially similar to (but not limited to) corresponding operations disclosed elsewhere herein.

The system and methods, flow diagrams, and structure block diagrams described in this specification may be implemented in computer processing systems including program code comprising program instructions that are executable by a computer processing system. Other implementations may also be used. Additionally, the flow diagrams and structure block diagrams herein described describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a suitable communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Processors suitable for the execution of a computer program include, by way of example only and without limitation, both general and special purpose microprocessors, and any one or more processors of any kind of digital computer. Generally, a processor will receive instructions and data from a read only memory or a random access memory or both.

To provide for interaction with a user or manager of the system described herein, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes back end component(s) including one or more data servers, or that includes one or more middleware components such as application servers, or that includes a front end component such as a client computer having a graphical user interface or a Web browser through which a user or administrator can interact with some implementations of the subject matter described is this specification, or any combination of one or more such back end, middleware, or front end components. The components of the system can be interconnected by any form or medium of digital data communication, such as a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
 ingesting at least one audiovisual stream, including at least
  storing at least some data associated with one or more frames of the audiovisual stream into a data store of program content;
 determining a candidate segment, the candidate segment including at least one or more sequential frames from the at least one ingested audiovisual stream, including at least:
  adjusting at least one threshold associated with matching, the adjusted at least one threshold associated with a lower returned number of suspects;

matching the candidate segment with one or more contiguous sequences of frames previously stored in the data store based at least partially on the adjusted at least one threshold; and if the candidate segment matches the one or more contiguous sequences of frames previously stored in the data store based at least partially on the adjusted at least one threshold, determining starting and ending points of the candidate segment, including at least:

adjusting at least one threshold associated with matching, the adjusted at least one threshold associated with a higher returned number of suspects;

comparing one or more indications associated with each frame in the candidate segment with one or more indications associated with a corresponding frame in the one or more contiguous sequences of frames previously stored in the data store, the comparing based at least partially on the adjusted at least one threshold; and testing for inconsistencies between each frame in the candidate segment and a corresponding frame in the one or more contiguous sequences of frames previously stored in the data store, based at least partially on the comparing; and testing the determined candidate segment for at least one match in a data store of known advertisements and, if testing the candidate segment returns at least one match in the data store of known advertisements, at least removing at least some data associated with the candidate segment from the data store of program content, wherein at least one of the ingesting, determining, or testing is at least partially implemented using at least one processing device.

2. The method of claim 1, further comprising:
testing the determined candidate segment for at least one match in the data store of program content and, if testing the candidate segment returns at least one match in the data store of program content, at least removing at least some data associated with the candidate segment from the data store of program content and storing at least some data associated with the candidate segment in the data store of known advertisements.

3. The method of claim 1, wherein determining a candidate segment, the candidate segment including at least one or more sequential frames from the at least one ingested audiovisual stream comprises:

receiving one or more indications of a frame of the ingested audiovisual data stream;

analyzing the one or more indications of a frame, including at least determining whether the one or more indications could be a starting frame of a candidate segment;

if a starting frame is determined, analyzing one or more frames received subsequent to the starting frame, including at least determining whether one of the one or more frames received subsequent to the starting frame could be an ending frame; and if an ending frame is determined, establishing (i) the starting frame, (ii) the one or more frames received subsequent to the starting frame and previous to the ending frame, and (iii) the ending frame as the candidate segment.

4. The method of claim 3, wherein analyzing the one or more indications of a frame, including at least determining whether the one or more indications could be a starting frame of a candidate segment and analyzing one or more frames received subsequent to the starting frame, including at least determining whether a frame received subsequent to the starting frame could be an ending frame comprise:

determining whether a frame is at least one of a monochromatic frame or a frame having one or more substantially different fingerprint values from an immediately-previous frame and, if a frame is at least one of a monochromatic frame or a frame having one or more substantially different fingerprint values from an immediately-previous frame, establishing the frame as at least one of a starting frame or an ending frame.

5. The method of claim 1, wherein determining a candidate segment, the candidate segment including at least one or more sequential frames from the at least one ingested audiovisual stream comprises:

receiving one or more indications of a frame of the ingested audiovisual data stream;

comparing data associated with a contiguous sequence of ingested frames ending with the most recently received frame with data associated with one or more contiguous sequences of frames previously stored in the data store of program content; and providing one or more indications of one or more contiguous sequences of frames previously stored in the data store of program content based at least partially on the comparing data.

6. The method of claim 5, further comprising:
for each of the one or more indicated contiguous sequences of frames, determining whether the contiguous sequence of frames is an advertisement.

7. The method of claim 6, wherein determining whether the contiguous sequence of frames is an advertisement comprises:

evaluating at least one of a length in seconds or a count in frames associated with the contiguous sequence of frames and, if the at least one of a length in seconds or a count in frames is substantially similar to a standard advertisement length, establishing the contiguous sequence of frames as a candidate segment.

8. The method of claim 1, wherein adjusting at least one threshold associated with matching, the adjusted at least one threshold associated with a lower returned number of suspects comprises:

adjusting at least one radius associated with a path pursuit algorithm, the adjusted at least one radius associated with a lower returned number of suspects.

9. The method of claim 1, wherein adjusting at least one threshold associated with matching, the adjusted at least one threshold associated with a lower returned number of suspects comprises:

adjusting at least one duration related to at least one bin associated with a path pursuit algorithm, the adjusted at least one radius associated with a lower returned number of suspects.

10. The method of claim 1, wherein testing for inconsistencies between each frame in the candidate segment and a corresponding frame in the one or more contiguous sequences of frames previously stored in the data store, based at least partially on the comparing comprises:

if any frame of the candidate segment does not have a corresponding match in the one or more contiguous sequences of frames previously stored in the data store, dropping the frame of the candidate segment without a corresponding match from the one or more contiguous sequences of frames previously stored in the data store.

11. The method of claim 1, wherein testing for inconsistencies between each frame in the candidate segment and a corresponding frame in the one or more contiguous sequences of frames previously stored in the data store, based at least partially on the comparing comprises:

if any frame of the one or more contiguous sequences of frames previously stored in the data store does not have a corresponding match in the candidate segment, adding the frame of the one or more contiguous sequences of frames previously stored in the data store to the candidate segment.

12. The method of claim 1, wherein testing for inconsistencies between each frame in the candidate segment and a corresponding frame in the one or more contiguous sequences of frames previously stored in the data store, based at least partially on the comparing comprises:

testing for inconsistencies between each frame in the candidate segment and a corresponding frame in the one or more contiguous sequences of frames previously stored in the data store, based at least partially on the comparing; and remediating any inconsistencies found via testing, the remediating operable to identify borders of the candidates.

13. The method of claim 1, wherein ingesting at least one audiovisual stream, including at least storing at least some data associated with one or more frames of the audiovisual stream into a data store of program content and testing the determined candidate segment for at least one match in a data store of known advertisements and, if testing the candidate segment returns at least one match in the data store of known advertisements, at least removing at least some data associated with the candidate segment from the data store of program content comprise:

ingesting at least two audiovisual streams, including at least storing at least some data associated with one or more frames of at least one of the at least two audiovisual streams into a data store of program content, the at least some data including at least one indication of the audiovisual stream from which the one or more frames were received, and testing the determined candidate segment for at least one match in a data store of known advertisements and, if testing the candidate segment returns at least one match in the data store of known advertisements, the at least one match related to any of the at least two audiovisual streams, at least removing at least some data associated with the candidate segment from the data store of program content.

14. The method of claim 1, wherein determining a candidate segment, the candidate segment including at least one or more sequential frames from the at least one ingested audiovisual stream comprises:

confirming a candidate segment having a low threshold match at least partially based on at least one duration of the candidate segment; and confirming the candidate segment having a high threshold match at least partially based on a match of one or more fingerprints of the candidate segment with a known advertisement.

15. The method of claim 1, wherein determining a candidate segment, the candidate segment including at least one or more sequential frames from the at least one ingested audiovisual stream comprises:

determining a segment which may be at least one of an advertisement, a commercial, a public service announcement, a promotion, at least a portion of an ad break, at least a portion of an ad pod, or an upcoming television programming promotion.

16. The method of claim 1, wherein determining a candidate segment, the candidate segment including at least one or more sequential frames from the at least one ingested audiovisual stream comprises:

determining a candidate segment, the candidate segment including at least one or more sequential video frames from the at least one ingested audiovisual stream.

17. The method of claim 1, wherein ingesting at least one audiovisual stream, including at least storing at least some data associated with one or more frames of the audiovisual stream into a data store of program content comprises:

ingesting at least one audiovisual stream associated with at least one television program source, including at least one of a satellite ingest, a fiber optic ingest, a microwave ingest, a cable ingest, a telephonic ingest, an ISDN ingest, an Internet ingest, an over-the-air ingest, or a recorded medium ingest.

18. The method of claim 1, wherein ingesting at least one audiovisual stream, including at least storing at least some data associated with one or more frames of the audiovisual stream into a data store of program content comprises:

ingesting at least one audiovisual stream associated with at least one television program source at least partially received via at least one satellite dish, at least one fiber optic connection, at least one microwave receiver, at least one cable television connection, at least one telephone line, at least one ISDN line, at least one network connection, at least one over-the-air antenna, or at least one recorded medium.

19. A computer program product, comprising:

at least one non-transitory computer-readable medium including at least:

one or more instructions for ingesting at least one audiovisual stream, including at least storing at least some data associated with one or more frames of the audiovisual stream into a data store of program content;

one or more instructions for determining a candidate segment, the candidate segment including at least one or more sequential frames from at least one ingested audiovisual stream, including at least:

one or more instructions for adjusting at least one threshold associated with matching, the adjusted at least one threshold associated with a lower returned number of suspects;

one or more instructions for matching the candidate segment with one or more contiguous sequences of frames previously stored in the data store based at least partially on the adjusted at least one threshold; and one or more instructions for if the candidate segment matches the one or more contiguous sequences of frames previously stored in the data store based at least partially on the adjusted at least one threshold, determining starting and ending points of the candidate segment, including at least:

one or more instructions for adjusting at least one threshold associated with matching, the adjusted at least one threshold associated with a higher returned number of suspects;

one or more instructions for comparing one or more indications associated with each frame in the candidate segment with one or more indications associated with a corresponding frame in the one or more contiguous sequences of frames previously stored in the data store, the comparing based at least partially on the adjusted at least one threshold; and one or more instructions for testing for inconsistencies between each frame in the candidate segment and a corresponding frame in the one or more contiguous sequences of frames previously stored in the data store, based at least partially on the comparing; and one or more instructions for testing a determined candidate segment for at least one match in a data store of known advertisements and, if testing the candidate segment returns at least one match in the data store of known advertisements, at least removing at least some data associated with the candidate segment from the data store of program content.

20. The computer program product of claim 19, wherein at least some of the one or more instructions for adjusting at least one threshold associated with matching, the adjusted at least one threshold associated with a lower returned number of suspects comprises:

one or more instructions for adjusting at least one duration related to at least one bin associated with a path pursuit algorithm, the adjusted at least one radius associated with a lower returned number of suspects.

21. A system, comprising:

circuitry for ingesting at least one audiovisual stream, including at least storing at least some data associated with one or more frames of the audiovisual stream into a data store of program content;

circuitry for determining a candidate segment, the candidate segment including at least one or more sequential frames from at least one ingested audiovisual stream, including at least:

circuitry for adjusting at least one threshold associated with matching, the adjusted at least one threshold associated with a lower returned number of suspects;

circuitry for matching the candidate segment with one or more contiguous sequences of frames previously stored in the data store based at least partially on the adjusted at least one threshold; and circuitry for, if the candidate segment matches the one or more contiguous sequences of frames previously stored in the data store based at least partially on the adjusted at least one threshold, determining starting and ending points of the candidate segment, including at least:

circuitry for adjusting at least one threshold associated with matching, the adjusted at least one threshold associated with a higher returned number of suspects;

circuitry for comparing one or more indications associated with each frame in the candidate segment with one or more indications associated with a corresponding frame in the one or more contiguous sequences of frames previously stored in the data store, the comparing based at least partially on the adjusted at least one threshold; and circuitry for testing for inconsistencies between each frame in the candidate segment and a corresponding frame in the one or more contiguous sequences of frames previously stored in the data store, based at least partially on the comparing; and circuitry for testing a determined candidate segment for at least one match in a data store of known advertisements and, if testing the candidate segment returns at least one match in the data store of known advertisements, at least removing at least some data associated with the candidate segment from the data store of program content.

22. The system of claim 21, wherein the circuitry for adjusting at least one threshold associated with matching, the adjusted at least one threshold associated with a lower returned number of suspects comprises:

circuitry for adjusting at least one duration related to at least one bin associated with a path pursuit algorithm, the adjusted at least one radius associated with a lower returned number of suspects.

23. A system, comprising:

means for ingesting at least one audiovisual stream, including at least storing at least some data associated with one or more frames of the audiovisual stream into a data store of program content;

means for determining a candidate segment, the candidate segment including at least one or more sequential frames from at least one ingested audiovisual stream, including at least:

means for adjusting at least one threshold associated with matching, the adjusted at least one threshold associated with a lower returned number of suspects;

means for matching the candidate segment with one or more contiguous sequences of frames previously stored in the data store based at least partially on the adjusted at least one threshold; and means for, if the candidate segment matches the one or more contiguous sequences of frames previously stored in the data store based at least partially on the adjusted at least one threshold, determining starting and ending points of the candidate segment, including at least:

means for adjusting at least one threshold associated with matching, the adjusted at least one threshold associated with a higher returned number of suspects;

means for comparing one or more indications associated with each frame in the candidate segment with one or more indications associated with a corresponding frame in the one or more contiguous sequences of frames previously stored in the data store, the comparing based at least partially on the adjusted at least one threshold; and means for testing for inconsistencies between each frame in the candidate segment and a corresponding frame in the one or more contiguous sequences of frames previously stored in the data store, based at least partially on the comparing; and means for testing a determined candidate segment for at least one match in a data store of known advertisements and, if testing the candidate segment returns at least one match in the data store of known advertisements, at least removing at least some data associated with the candidate segment from the data store of program content, wherein at least one of the means for ingesting, means for determining, or means for testing is at least partially implemented using computing hardware.

24. The system of claim 23, wherein the means for adjusting at least one threshold associated with matching, the adjusted at least one threshold associated with a lower returned number of suspects comprises:

means for adjusting at least one duration related to at least one bin associated with a path pursuit algorithm, the adjusted at least one radius associated with a lower returned number of suspects.

25. A system, comprising:

one or more computing devices; and at least some instructions which executed on at least one of the one or more computing devices, cause at least one of the one or more computing devices to at least:
ingest at least one audiovisual stream, including at least storing at least some data associated with one or more frames of the audiovisual stream into a data store of program content;
determine a candidate segment, the candidate segment including at least one or more sequential frames from at least one ingested audiovisual stream, including at least:
adjusting at least one threshold associated with matching, the adjusted at least one threshold associated with a lower returned number of suspects;
matching the candidate segment with one or more contiguous sequences of frames previously stored in the data store based at least partially on the adjusted at least one threshold; and
if the candidate segment matches the one or more contiguous sequences of frames previously stored in the data store based at least partially on the adjusted at least one threshold, determining starting and ending points of the candidate segment, including at least:
adjusting at least one threshold associated with matching, the adjusted at least one threshold associated with a higher returned number of suspects;
comparing one or more indications associated with each frame in the candidate segment with one or more indications associated with a corresponding frame in the one or more contiguous sequences of frames previously stored in the data store, the comparing based at least partially on the adjusted at least one threshold; and
testing for inconsistencies between each frame in the candidate segment and a corresponding frame in the one or more contiguous sequences of frames previously stored in the data store, based at least partially on the comparing; and
test a determined candidate segment for at least one match in a data store of known advertisements and, if testing the candidate segment returns at least one match in the data store of known advertisements, at least removing at least some data associated with the candidate segment from the data store of program content.

26. The system of claim 25, wherein one or more of the at least some instructions which, when executed on at least one of the one or more computing devices, cause at least one of the one or more computing devices to adjust at least one threshold associated with matching, the adjusted at least one threshold associated with a lower returned number of suspects, cause at least one of the computing devices to at least:
adjust at least one duration related to at least one bin associated with a path pursuit algorithm, the adjusted at least one radius associated with a lower returned number of suspects.

* * * * *